(12) United States Patent
Holloway et al.

(10) Patent No.: US 6,973,094 B1
(45) Date of Patent: Dec. 6, 2005

(54) PACKET-SWITCHED MULTIPLE-ACCESS NETWORK SYSTEM WITH DISTRIBUTED FAIR PRIORITY QUEUING

(75) Inventors: John T. Holloway, Woodside, CA (US); Jason Trachewsky, Menlo Park, CA (US); Henry Ptasinski, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 942 days.

(21) Appl. No.: 09/676,697

(22) Filed: Sep. 29, 2000

(51) Int. Cl.[7] ............................................. H04L 12/413
(52) U.S. Cl. ....................... 370/445; 370/348; 375/235
(58) Field of Search ................................ 370/445, 447, 370/448, 444, 443, 348

(56) References Cited

U.S. PATENT DOCUMENTS

| | | | |
|---|---|---|---|
| 4,063,220 A | 12/1977 | Metcalfe et al. | 340/147 LP |
| 4,623,886 A | 11/1986 | Livingston | 340/825.5 |
| 4,766,591 A * | 8/1988 | Huang | 370/445 |
| 5,319,641 A | 6/1994 | Fridrich et al. | 370/85.3 |
| 5,553,072 A | 9/1996 | Daggett et al. | 370/85.3 |
| 5,600,651 A | 2/1997 | Molle | 370/448 |
| 5,774,658 A * | 6/1998 | Kalkunte et al. | 709/230 |
| 5,822,538 A * | 10/1998 | Krishna et al. | 709/235 |
| 6,078,591 A * | 6/2000 | Kalkunte et al. | 370/448 |
| 6,130,894 A * | 10/2000 | Ojard et al. | 370/421 |
| 6,181,687 B1 * | 1/2001 | Bisdikian | 370/347 |
| 6,529,520 B1 * | 3/2003 | Lee et al. | 370/442 |
| 6,760,347 B1 * | 7/2004 | Ojard et al. | 370/516 |
| 6,791,996 B1 * | 9/2004 | Watanabe et al. | 370/447 |

FOREIGN PATENT DOCUMENTS

EP     0 299 639 (A2)        1/1989

OTHER PUBLICATIONS

A Review of Contention Resolution Algorithms for IEEE 802.14 Network, Nada Golmie, Yves Saintllan, and David H.Su, National Institute for Standards and Technology.*
Capetanakis, J.J., "Tree Algorithms for Packet Broadcast Channels," IEEE Transactions on Information Theory, Sep. 1979, vol. IT—25, No. 5 (ISSN 0018 9448), pp. 505-151, IEEE.
Whetten, B. et al., "The Packet Starvation Effect in CSMA/CD LANs and a Solution," 19th Conference on Local Computer Networks, Oct. 2-5, 1994, Minneapolis, Minnesota, pp. 206-217, IEEE Computer Society Press, Los Alamitos, California.

* cited by examiner

*Primary Examiner*—Wellington Chin
*Assistant Examiner*—Andrew C. Lee
(74) *Attorney, Agent, or Firm*—Christie, Parker & Hale, LLP

(57) ABSTRACT

A packet-switched multiple-access network system with a distributed fair priority queuing media access control protocol that provides multiple levels of priority of access and fair collision resolution with improved performance is disclosed. In one embodiment, the system provides high-speed transport of multimedia information on a shared channel. Further, in one embodiment, MAC level side-band signaling that is useful to other levels of the network protocol (e.g., the physical layer) is also provided.

39 Claims, 5 Drawing Sheets

PACKET-SWITCHED MULTIPLE-ACCESS NETWORK SYSTEM WITH DISTRIBUTED FAIR PRIORITY QUEUING

FIELD OF THE INVENTION

The present invention relates to packet-switched communication systems, and in particular, to an apparatus and a method for a packet-switched multiple-access network system with distributed fair priority queuing.

BACKGROUND

Packet-switched communication systems (e.g., packet-switched networks) are useful for the transport of data over shared communication channels on a variety of physical media such as twisted-pair, coaxial cable, power lines, and wireless. The data communicated may include multimedia information such as voice data and video data.

One such system that is in wide-spread commercial use is standard ethernet (e.g., ethernet is commonly used in LANs (Local Area Networks)). Systems such as standard ethernet use a multiple-access technique to coordinate access among several stations contending for use of a shared channel. In particular, standard ethernet is based on 1-persistent Carrier Sense Multiple Access with Collision Detect (CSMA/CD) with a Collision Resolution Algorithm (CRA) referred to as Binary Exponential Backoff (BEB).

In a CSMA/CD network, a shared communication channel is shared by network terminals or stations (e.g., personal computers and printers). Transmissions on the channel are segmented into variable length packets. Only one station is granted access to place (i.e., transmit) a packet on the channel at any given time, and the presence of a packet can be detected by all the stations using a carrier sensing device. All stations obey a distributed access protocol that includes the following stages: (1) a station wishing to transmit a packet monitors the channel to detect the absence of carrier; (2) when the channel is idle each contending station commences transmission; and (3) if a transmitting station detects energy from another transmitting station during its use of the channel (i.e., collision detection), then the station abandons its transmission and activates a Collision Resolution Algorithm (CRA) to resolve the access ordering among the contending stations.

In standard ethernet, the CRA is BEB. In BEB, a count of the number of collisions (N) during attempts to transmit a given packet is maintained by each station, a random number K is chosen from the interval 0 to $2^N-1$, and the station waits for slot K following the end of the current transmission before attempting transmission. If some other station commences transmission before slot K the current station defers until the end of that transmission and restarts its CRA. However, the standard ethernet protocol lacks robust performance and is inefficient.

For example, the BEB approach can cause an order of magnitude increase in channel access latency for some stations under modest offered load (also known as the packet starvation effect in CSMA/CD LANs).

SUMMARY

Accordingly, the present invention provides a packet-switched multiple-access network system with a Distributed Fair Priority Queuing (DFPQ) MAC (Media Access Control) protocol that provides improved performance and efficiency. In one embodiment, the present invention provides a fair collision resolution MAC protocol with multiple priority levels of access. In this embodiment, a stack or tree algorithm is used instead of the BEB algorithm of standard ethernet.

In particular, the time period following the end of a previous transmission is divided into slots, which are sized such that a signal can traverse both directions of the longest path in the shared channel with some margin during one slot. In particular, when used for contention, the slots are numbered by priority level with the highest priority level first. A first station selects the highest priority traffic waiting in the first station's transmit queue and contends during the slot assigned to that priority. Higher priority traffic from a second station will have commenced transmission before the slot corresponding to the first station's traffic and will therefore have absolute priority of access. When no higher priority traffic is waiting, the first station will have priority over all lower priority traffic waiting in other stations as the first station will commence transmission and defer the other lower priority stations.

If multiple stations have traffic waiting at the same priority level, then the multiple stations will attempt transmission simultaneously and collide. The collision is detected by transmitting stations and signaled to all stations. The collision can be detected, for example, by the fact that the collision transmission ends up being shorter in length than a legitimate data packet. Upon detection of a collision, all stations enter a contention resolution phase, and specifically, a stack-based collision resolution cycle in accordance with one embodiment of the present invention. More specifically, a fair collision resolution MAC protocol is provided in which the first S slots following a collision are used as signal slots. For example, three signal slots can be provided. Upon a collision, each active station rolls an S-sided die to vote for one of the S signal slots (i.e., randomly selects a number between O to S) and transmits a signal in the chosen slot. Each station maintains a stack counter for each priority level. The priority level of the active collision resolution phase is the priority level of the collision that commenced the active collision resolution phase. All active stations monitor the signal slots, and for each signal preceding the slot chosen by a given station, the station increments its stack counter. Accordingly, each station that started the phase at a non-zero stack level increments its stack counter for each signal detected. After a successful transmission without collision, each active station decrements its stack counter for that priority level. In this manner, the stations order themselves at different stack levels based on the random vote of signal slots in each phase. In this embodiment, if another collision occurs in the subsequent contention slot, then the collision resolution protocol is re-invoked.

In this embodiment, each priority level has a separate stack counter, and a collision resolution sequence at a given priority level can be interrupted by transmissions at a higher priority level at any time. Also, the signal slots are only present immediately after a collision and do not create overhead after successful transmissions. In addition, unlike conventional approaches, slots are either used for priority ordering, for sensing a collision, or sending a signal, and the different uses are optimally selected to minimize overhead on the channel.

Further, in one embodiment, if the channel has been idle for a time longer than the series of slots assigned to defined priority levels, then all stations are free to contend. In this case, transmission order is determined on a first-come, first-served basis (i.e., no station has absolute priority).

Simulations have been performed examining the optimal number of signal slots (e.g., whether to use two signal slots, three signal slots, four signal slots, etc.). Under a set of assumptions regarding relative sizes of packets and slots, three signal slots was shown to be optimal, although the system performed nearly as well with two or four signal slots.

Further, in one embodiment, stations are assigned priority levels according to bandwidth class such that higher baud rate transmissions are given preferential priority to the segment. As a result, the aggregate capacity of the segment is optimized towards the higher baud rate.

In another embodiment, stations alternate between priority levels with probability according to bandwidth class such that the aggregate capacity is divided in any proportion between different baud rate transmissions. As a result, the aggregate capacity is optimized and access is fairly apportioned between stations of different bandwidth class.

In another embodiment, instead of choosing a random slot at each contention resolution phase, a deterministic choice can be made, and furthermore, a deterministic contention resolution sequence of arbitrary depth can be forced by short transmissions mimicking collisions. In particular, the sequence of deterministic choices finalizing in a resolution represent a label or side-band data (e.g., side-band signaling) conveyed entirely within the MAC layer. In this embodiment, the label is used to identify the source station in multicast transmissions to assist the physical (PHY) layer in choosing demodulation parameters appropriate to the multicast source. Further, an additional use of the MAC labeling mechanism is to allow stations without the ability to detect collisions (e.g., which may occur during initialization on channels that present strong echoes), to gain access to the channel for echo probing. By sending a sufficiently long and unique label using the MAC contention resolution signaling described above, an initializing station can ensure an arbitrarily low probability of collision with another station, even though the initializing station lacks the ability to detect collisions.

In yet another embodiment, a HOLDOFF signal is appended to the end of a successful packet transmission, which signals all the distributed MAC entities to delay contention for a block of slots. For example, the HOLDOFF signal is useful for accommodating exceptional round-trip latencies between a central office station remote from LAN stations.

Other aspects and advantages of the present invention will become apparent from the following detailed description and accompanying drawings.

DETAILED DESCRIPTION OF THE PREFERRED EMBODIMENTS

In one embodiment, the present invention provides a packet-switched multiple-access network system with a Distributed Fair Priority Queuing (DFPQ) MAC (Media Access Control) protocol that provides improved performance and also provides fair collision resolution with multiple priority levels of access. For example, a network that offers guarantees of Quality of Service (QoS) to certain traffic streams such that controlled streams access the network at a higher priority than uncontrolled traffic would significantly benefit from this embodiment of the present invention.

Figure 1:
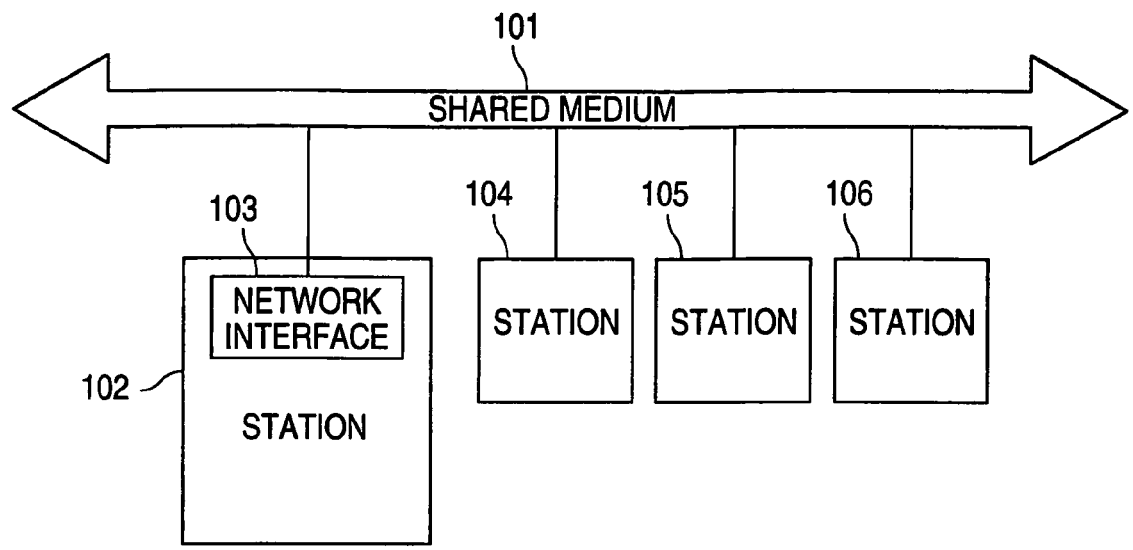
FIG. 1 is a block diagram of a shared-medium broadcast network with attached stations in accordance with one embodiment of the present invention.

FIG. 1 is a block diagram of a shared-medium broadcast network 101 with attached stations (102, 104, 105, and 106) in accordance with one embodiment of the present invention. In particular, the physical medium of shared-medium 101 is either: (1) a network of connected twisted-pair wiring segments such as found in premises telephone wiring; (2) a network of power wiring such as found within a residence; (3) a network of connected coaxial cable segments such as found in premises CATV (cable television) wiring; (4) a wireless medium represented by infrared, RF (Radio Frequency) or microwave broadcast; or (5) any combination of the above.

Station 102 includes a network interface 103 that attaches the host logic of station 102 to shared-medium 101. In particular, network interface 103 transmits and receives packets of information. In this embodiment, all stations (i.e., stations 102, 104, 105, and 106) include a network interface such as network interface 103. The access control for shared-medium 101 is accomplished through a DFPQ (Distributed Fair Priority Queuing) MAC (Media Access Control) protocol operating in each network interface in each station. Thus, there is no central controller.

The signals on shared-medium 101 may be baseband (using spectrum extending up from DC) or passband (using a spectral range centered away from DC). The signals may use a range of modulation and coding techniques to communicate data within a packet such as (1) pulse amplitude modulation; (2) quadrature amplitude modulation and carrierless amplitude phase modulation; (3) multi-tone modulation; or (4) frequency or phase modulation.

In particular, the signals using these modulation and coding techniques can be assigned to logical channels on a given physical medium using multiplexing techniques such as (1) baseband, utilizing frequencies down to DC; (2) frequency division multiplexed, wherein each channel uses a distinct passband of frequencies on the physical medium; (3) code division multiplexed, wherein each channel is associated with a set of pseudo-random code sequences; or (4) time division multiplexed, wherein each channel occupies a specific time interval in a repeating time frame. For example, if employing passband modulation, there may be a series of logical channels Frequency Division Multiplexed (FDM) onto shared-medium 101. In this example, each logical channel may have a unique instance of a multiple access control entity, which is discussed below with respect to FIG. 2. The logical channel used for the specific signals comprising the distributed fair priority queuing MAC protocol may be shared with the channel used for payload data of packet transmissions, or alternatively the MAC specific signals can occupy a separate logical channel coordinated with data transmissions in other logical channels. In a preferred embodiment, a single channel passband Quadrature Amplitude Modulation (QAM) technique is used.

Figure 2:
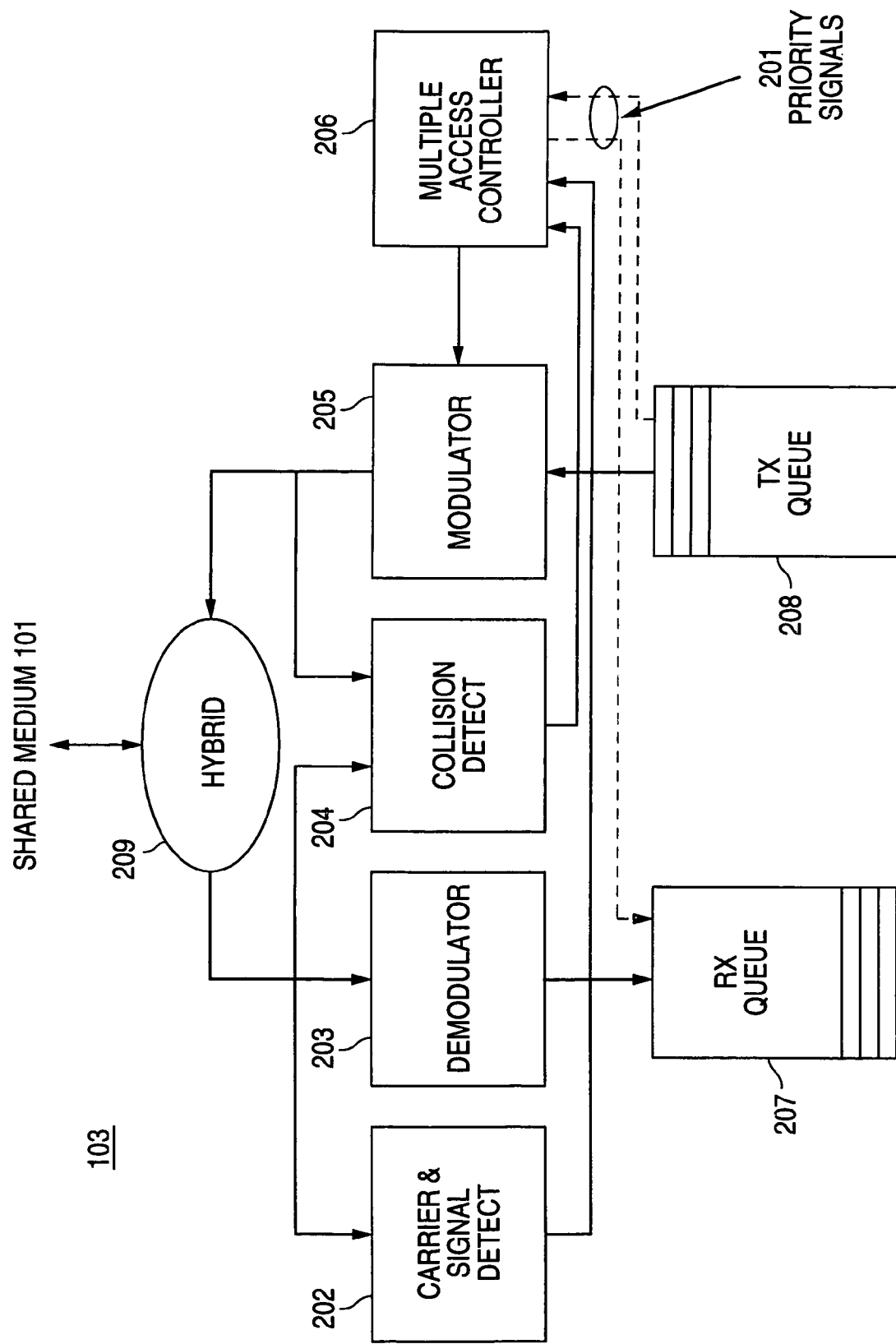
FIG. 2 is a functional diagram of the network interface of FIG. 1 in accordance with one embodiment of the present invention.

FIG. 2 is a functional diagram of network interface 103 in accordance with one embodiment of the present invention. In particular, attachment to shared-medium 101 is made via a HYBRID 209 which separates the receive signal (into a demodulator 203) from the transmit signal (from a modulator 205). A demodulator 203 includes a signal chain that includes gain control, matched filter, resampler, feed-forward equalizer, decision feedback equalizer, demodulator, timing recovery for carrier and baud, sampler, maximum likelihood sequence estimator, error decoder, and framing logic. Demodulator 203 converts the continuous time signals from HYBRID 209 into packet data which is stored in an RX queue 207 for use by the host station logic of station 102.

A carrier & signal detect 202 computes the power level of the received signal and compares this level to a threshold level producing a binary indication of a presence or absence of signal. The output of carrier & signal detect 202 is connected to a multiple access controller 206.

A modulator 205 generally performs the inverse function of demodulator 203. In particular, modulator 205 converts packet data from a TX queue 208 into a continuous time signal that can be applied to shared-medium 101. Control of the modulator 205 transmission is made by multiple access controller 206. The transmitted output of modulator 205 is compared with the received signal in a collision detect 204. Any detected difference indicates that some other station is transmitting on shared-medium 101. In a preferred embodiment, the detection operation involves computation of an echo replica of the transmitted signal using a standard FIR filter calibrated with coefficients measured during non-colliding transmissions. The power level of the detected difference signal is compared to a threshold level and generates a collision detect signal which is connected to multiple access controller 206.

Multiple access controller 206 also receives input from TX queue 208 regarding the priority such as priority signals 201 and desired (MAC) label (if any) for the packet ready to be transmitted. Multiple access controller 206 also outputs the detected priority and label of received signals to RX queue 207 along with the packet data from demodulator 203.

Simulations have been performed examining the optimal number of signal slots (e.g., whether to use two signal slots, three signal slots, four signal slots, etc.). Under a set of assumptions regarding relative sizes of packets and slots, three signal slots was shown to be optimal, although the system performed nearly as well with two or four signal slots.

Figure 3:
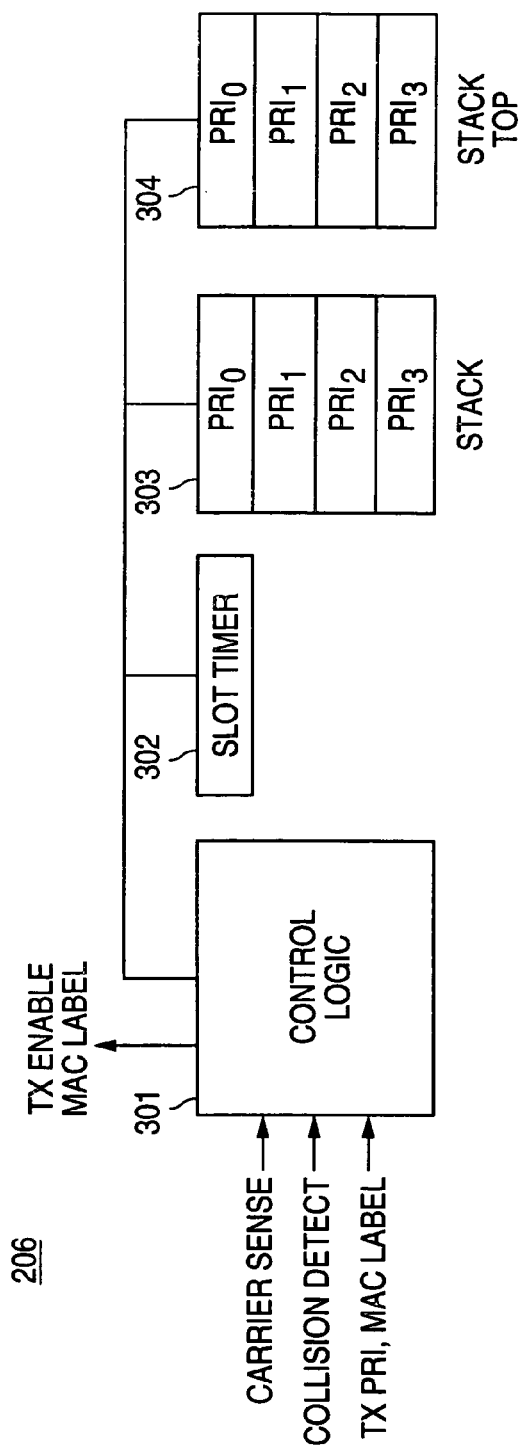
FIG. 3 is a functional diagram of the multiple access controller of FIG. 2 in accordance with one embodiment of the present invention.

FIG. 3 is a functional diagram of multiple access controller 206 in accordance with one embodiment of the present invention. In particular, inputs to CONTROL LOGIC 301 include a carrier sense signal from carrier & signal detect 202 as well as a collision detect signal from collision detect 204. Also, the priority level and desired label (if any) of the packet in TX queue 208 that is to be transmitted are input to CONTROL LOGIC 301.

When the carrier sense signal becomes inactive, CONTROL LOGIC 301 activates a SLOT TIMER 302, which identifies slots as contentions or signals. In particular, one function of CONTROL LOGIC 301 is to monitor for collisions and signals and to maintain a counter STACK 303 and a counter STACK TOP 304. The following pseudo-code illustrates an implementation of this functionality of CONTROL LOGIC 301 in accordance with one embodiment of the present invention:

After successful packet transmission,
    STACK[priority]—, STACKTOP[priority]—
ELSE collision THEN
    IF STACK[priority]=0, THEN select S0, S1, or S2, send signal,
        IF selected S1, THEN STACK[priority]+=S0
        IF selected S2, THEN STACK[priority]+=S0+S1
    ELSE STACK[priority]+=S0+S1+S2−1
STACKTOP[priority]+=S0+S1+S2−1
IF new packet arrival, THEN STACK[priority]=STACKTOP[priority]+1.

CONTROL LOGIC 301 will only enable transmission (e.g., station active) when STACK counter 303 at the current priority level is equal to zero. If the given station has encountered a collision on previous attempts, it may be that STACK counter 303 has been increased above zero thereby making the given station defer to other contending stations. At the end of a successful transmission, all stations decrease their STACK counter 303 by one, which will make those stations at the top of the stack (counter value one) now active.

In one embodiment, when a station encounters a collision, the station randomly selects a value in the range 0 . . . 2 (i.e., assuming that there are three signal slots: S0, S1, and S2) and asserts a signal in the corresponding signal slot. This signal informs all the contending stations that there are one or more active stations choosing that slot. These signals allow the stations to resolve their ordering. In particular, those stations signaling in lowered numbered slots will contend before stations selecting higher numbered slots. The STACK counter 303 keeps track of this order. If a station is not active (i.e., STACK counter 303 is non-zero), then STACK counter 303 increases its stack level to accommodate previously active stations now entering the stack. Only the stations signaling in the lowest numbered signal slot will be active in the next round.

Counter STACK TOP 304 tracks the highest stack level for any station, at each priority level. This is used to set the stack level for stations becoming active with new packet data during a cycle of collision resolution. This improves the fairness of access, ensuring that late arriving stations do not gain preference over stations already contending. In an alternative embodiment, a "closed" entry policy is used, which inhibits new packet transmission until all the currently contending stations have finished transmission. In simulations, this alternative embodiment was found to produce non-optimal latency distributions.

In a preferred embodiment, the above pseudo-code is mapped into a hardware description language such as Verilog or VHDL, and automated synthesis tools (e.g., commercially available automated synthesis tools from Synopsys) are used to compile the computational structure into an ASIC (Application Specific Integrated Circuit). Alternatively, the pseudo-code can be translated into a high level programming language such as "C" and executed on a standard embedded microcontroller that is part of network interface 103. Alternatively, the pseudo-code can be translated into firmware and executed on a custom microcontroller or hardware finite-state machine.

Figure 4:
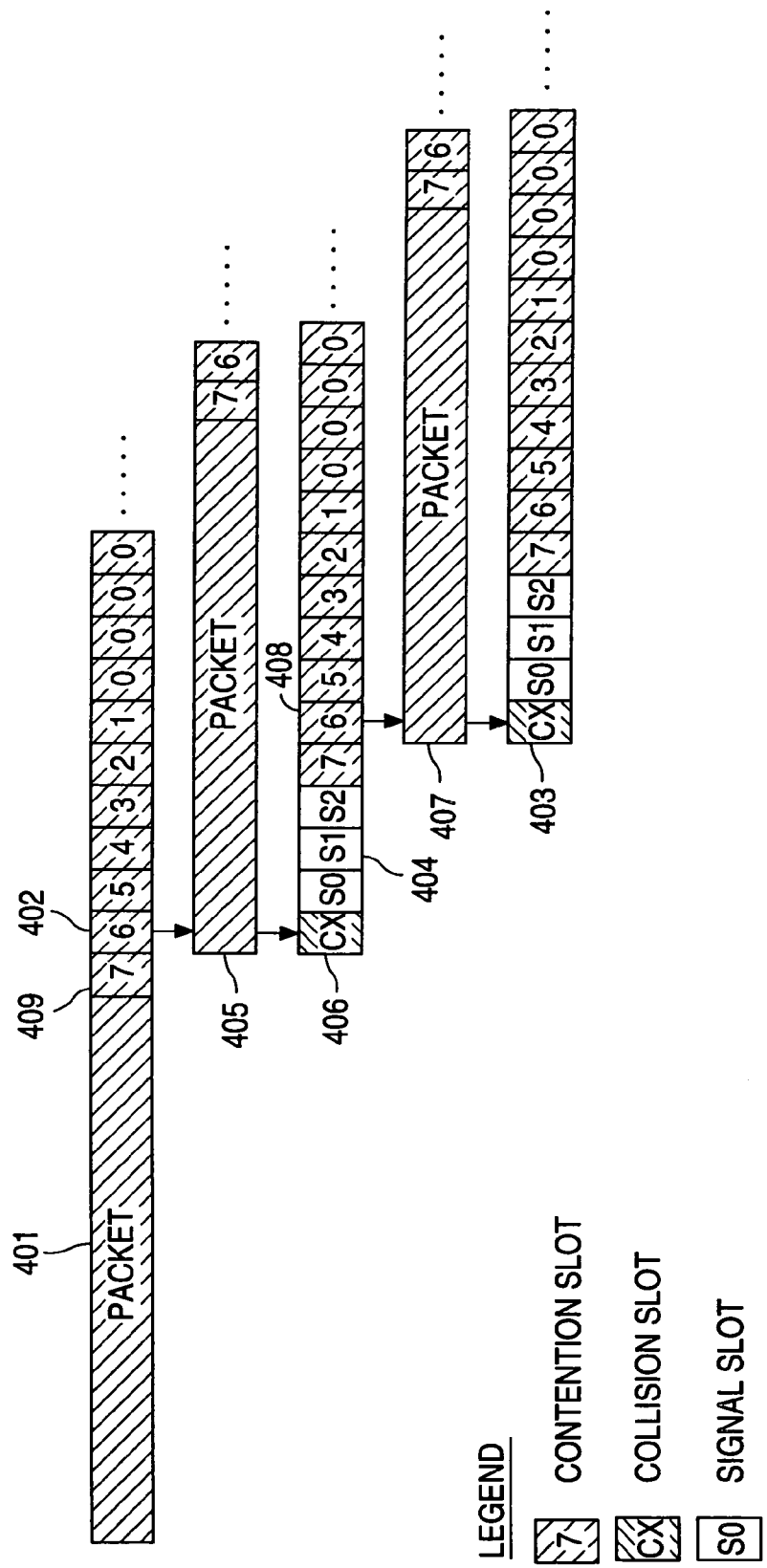
FIG. 4 is a timing diagram showing packet transmissions, slots, and collisions on a shared channel of the shared-medium of FIG. 1 in accordance with one embodiment of the present invention.

FIG. 4 is a timing diagram showing packet transmissions, slots, and collisions on a shared channel of shared-medium 101 in accordance with one embodiment of the present invention. A successful transmission is shown as PACKET 401. Immediately following the end of packet 401, a timer is started which divides time periods into a series of slots. The slots are ordered by priority with the highest priority first.

For example, in FIG. 4, eight (8) priority levels are shown, numbered 7 . . . 0. Priority level 6, slot 402, is the second slot following the end of PACKET 401. During slot 402 all stations with traffic ready at priority 6 attempt transmission. If only one such station is active, a successful packet transmission is made (e.g., PACKET 405).

However, if more than one station contends, then a collision is sensed (by collision detect 204 in each transmitting station). For example, the hybrid 209 separates the received signal from the transmitted signal produced by modulator 205, and a collision is detected by the presence of received energy from other transmitting stations. In another embodiment, the collision detect 204 augments the hybrid by subtracting an echo replica of the transmitted signal. In FIG. 4, a collision on the shared channel is indicated by reference numeral 406. Immediately following the collision, a series of signal slots are used to signal between colliding stations to resolve the collision. These slots are shown as S0, S1 (identified by reference numeral 404), and S2. Immediately following the sequence of signal slots, contention slots restart at priority 7. Assuming no priority 7 station has become active, then a subset of the stations contending in slot 402 retry transmission in slot 408. If the number of contending stations has been reduced to one, a successful packet is sent (e.g., PACKET 407), otherwise another collision occurs as indicated by reference numeral 403, and the collision resolution protocol is re-invoked.

Further, the above described (access) priority mechanism can be used to segregate traffic on a given segment (e.g., shared channel) that uses disparate modulation rates, which is particularly advantageous in a scaleable network system to allow mixed transmission at different baud rates. For example, a low cost interface may use transmissions at a rate of 1 Mbaud/sec (Megabaud per second), whereas a high performance interface may use transmissions at a rate of 10 Mbaud/sec. In this example, there is the possibility that traffic offered at the lower baud rate may occupy ten times as much time transmitting on the segment as traffic offered at the higher baud rate, and therefore, the aggregate bandwidth capacity of the segment is detrimentally reduced. Accordingly, in one embodiment, stations can be assigned (access) priority levels according to bandwidth class such that higher baud rate transmissions are given preferential priority to the segment. As a result, the aggregate capacity of the segment is optimized towards the higher baud rate. In another embodiment, stations choose between (access) priority levels with a statistical distribution designed to optimize the utilization of the aggregate capacity while ensuring that transmissions at a lower bandwidth class are not unfairly excluded from access to the channel.

In another embodiment, a HOLDOFF signal is inserted at the end of each successful transmission interval, at a time just prior to the contention slots (e.g., at a time identified by reference numeral 409 of FIG. 4). This signal informs the distributed multiple access controller 206 entities to insert a block of slots (e.g., 16 slots) before starting the countdown of contention slots. This time interval is then made available to a remote station (e.g., located at a central office at the other end of a wide-area subscriber loop) to commence transmission without superposing the requirement that the remote station be able to participate in the contention protocol (i.e., execute the DPFQ MAC protocol). This approach also allows multiple access controller 206 to synchronize contention cycles to an overall frame interval by detecting the proximity to a frame boundary and commencing a transmission which is artificially terminated to coincide with the origin of the next frame. Assertion of the HOLDOFF signal at the end of this special transmission can then allow the remote station to commence transmissions at a known time. For example, this network frame clock is useful in certain applications for sending synchronized data.

Figure 5:
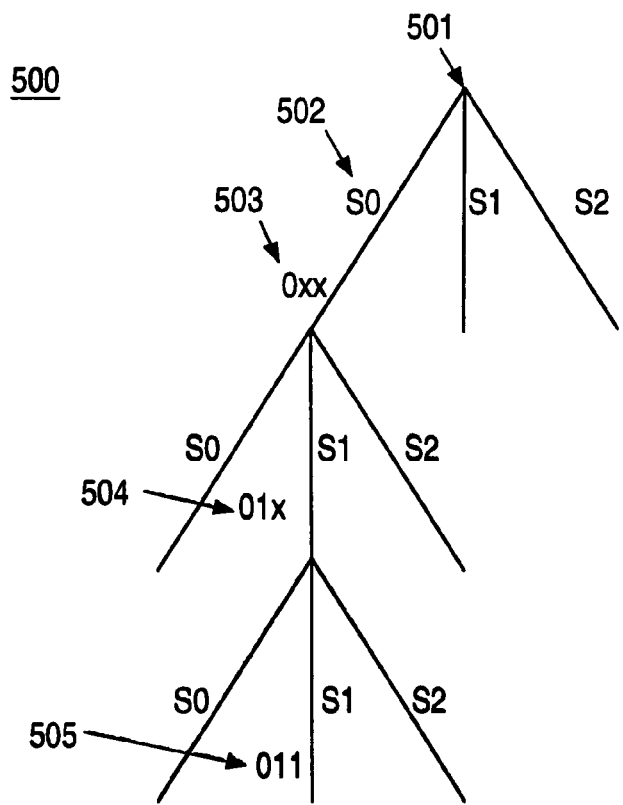
FIG. 5 is a diagram of a tree that represents a sequence of choices of signal slots selected during a contention cycle in accordance with one embodiment of the present invention.

FIG. 5 is a diagram of a tree 500 that represents a sequence of choices of signal slots selected during a contention cycle in accordance with one embodiment of the present invention. In particular, the sequence of choices of signal slots chosen during a contention cycle can be thought of as an address or (MAC) label. At the start of the cycle, shown as a node 501 at the top of tree 500, a station chooses one of three paths, shown as S0 (502), S1, or S2. The choice leading to the next node of tree 500 forms a digit of the label 0xx (503). As shown in FIG. 5, the next two selected choices are S1 leading to a label of 01x (504) and S1 leading to a label of 011 (505).

In one embodiment, these choices are selected randomly to ensure that the expected depth of the tree needed to resolve to a single station is optimally minimum. In this embodiment, the derived label merely reflects the random choices selected and conveys no useful information.

However, if a station makes non-random selections at each level of the contention tree, then when the station finally resolves successfully and transmits its packet, the station has also conveyed information in the form of a (MAC) label to the receiving station(s). In a preferred embodiment, the label is used to provide side-band signaling in four ways:

1) The label is used by multicasting stations to identify the source of a multicast and assist in the PHY layer. In particular, each multicasting station has been assigned a unique label, and the receiving stations use the label information to select the demodulation parameters corresponding to the identified source;
2) The label is used to select a unique sub-priority within a given priority level;
3) The label is used to force a low probability of collision for stations that cannot yet detect collisions, but need access to shared-medium 101 to transmit initialization signals to calibrate their collision detect blocks 204. In particular, the MAC labeling mechanism is to used to allow stations without the ability to detect collisions (e.g., which may occur during initialization on channels that present strong echoes) to gain access to the channel for echo probing. By sending a sufficiently long and unique label using the MAC contention resolution signaling described above, an initializing station can ensure an arbitrarily low probability of collision with another station, even though the initializing station lacks the ability to detect collisions; and
4) The label is used to identify certain packets for special treatment by layers or sub-layers of the protocol stack other than the PHY layer.

Figure 6:
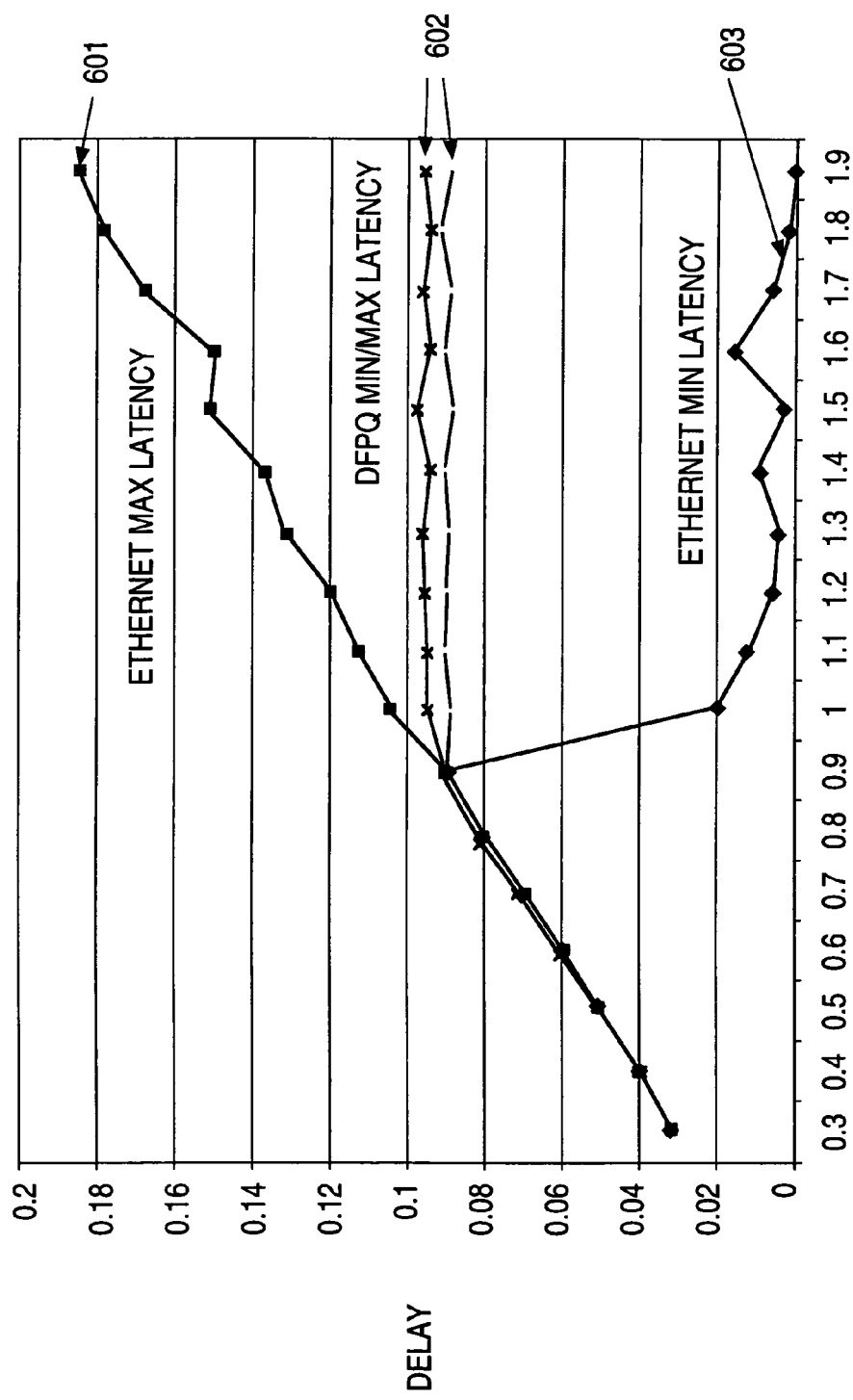
FIG. 6 is a plot of maximum and minimum latency versus offered load comparing the performance of a Distributed Fair Priority Queuing (DFPQ) Media Access Control (MAC) protocol in accordance with one embodiment of the present invention with standard ethernet.

FIG. 6 is a plot of maximum and minimum latency versus offered load comparing the DFPQ MAC protocol in accordance with one embodiment of the present invention with standard ethernet. In particular, FIG. 6 shows a simulation of ten stations with uniformly distributed traffic load in which the offered load was increased in steps, and the minimum and maximum of average latency across all ten stations is recorded for each run. As the offered load approaches 100%, ETHERNET MAX LATENCY shows the unfair access statistics known as the packet starvation effect, as discussed above. In particular, some stations see continuously increasing delay (601) while other stations "capture" the shared-medium and see minimum latency (603). In contrast, DFPQ MIN/MAX LATENCY shows a tight bound on latency (602) and is stable even under offered loads greater than 100%.

Figure 7:
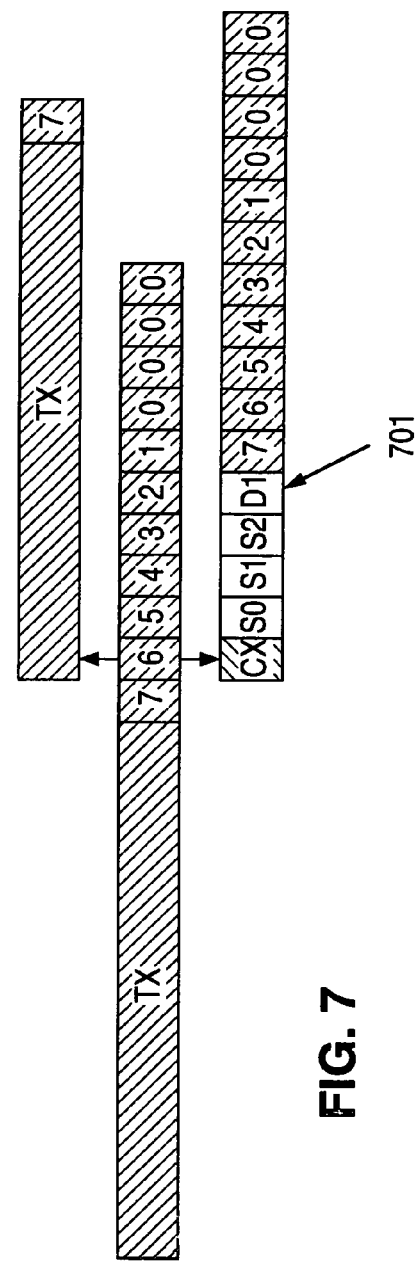
FIG. 7 is a timing diagram showing packet transmissions and slots of the shared-medium of FIG. 1 in accordance with another embodiment of the present invention.

FIG. 7 is a timing diagram showing packet transmissions and slots of shared-medium 101 in accordance with another embodiment of the present invention. In particular, the addition of a deterministic label indicator to the slot structure of the present invention allows a listening station to differentiate between a frame transmitted with a randomly-selected sequence of signal values (S choices, as discussed above with respect to FIG. 5) and a frame transmitted with a deterministic choice of signal values. Hence, a station that desires to transmit a deterministic CRA sequence also signals in a slot 701 (referred to as a "DI" slot) immediately following slot S(n), where n is the number of signal slots, and before the priority p, where p is the number of transmission priorities, transmission slot. The station only signals in DI slot 701 when it has transmitted the entire CRA sequence corresponding to the desired label and when it has chosen the first occupied signal slot (i.e., no other station chose slot S(k-1) if this station chose slot S(k)). There are three possible outcomes of this situation: (1) the station which has transmitted the deterministic label successfully transmits in its slot; (2) the station is preempted by a higher priority transmission; and (3) the station collides with another station of the same priority. In cases (2) and (3), signaling in the DI slot has no effect. However, in case (1), signaling in the DI slot serves to inform the listening stations that the transmission is one labeled by a deterministic CRA sequence. Thus, a listening station can unambiguously set the correct PHY parameters for the source.

Accordingly, in one embodiment, the present invention provides an efficient absolute access priority protocol that can be enforced per packet per station. The latency for higher priority traffic is almost entirely insulated from the offered load at lower priorities. In particular, multimedia traffic can be assured bounded access latencies proportional to the effective number of active stations at the same or higher priority level, which is advantageous for providing guarantees of QoS. Also, the priority mechanism adds little overhead to the standard ethernet MAC layer. Further, the maximum latency seen by any station is fairly distributed, has low variation, and is bounded close to the theoretical minimum for a perfectly fair queue. In particular, the packet starvation phenomenon of standard ethernet is eliminated. Further, the MAC protocol can be used to balance usage of the medium by different bandwidth classes of transmission thereby maintaining a higher aggregate capacity of the medium. Moreover, in one embodiment, the present invention provides additional signaling that is useful for other layers of the network protocol stack (e.g., the PHY layer).

Although particular embodiments of the present invention have been shown and described, it will be obvious to those skilled in the art that changes and modifications may be made without departing from the present invention in its broader aspects, and therefore, the appended claims are to encompass within their scope all such changes and modifications that fall within the true scope of the present invention.

What is claimed is:

1. A packet-switched multiple-access network system having a shared communication channel connecting a plurality of stations, each station comprising:
   a network interface, the network interface transmitting packets to the shared communication channel and receiving packets from the shared communication channel;
   a carrier sense for sensing whether the shared communication channel is in use and for preventing transmissions by the station when the shared communication channel is in use;
   a collision detect for detecting the occurrence of a collision between a first transmission by the station and a second transmission on the shared communication channel, and for causing a collision notification signal to be transmitted to the shared communication channel by the station when a collision is detected;
   a slot timer for dividing a time period following successful completion of a transmission on the shared communication channel into a plurality of contention slots in order of priority;
   a controller for monitoring a priority of a data packet awaiting transmission and for delaying transmission of the data packet awaiting transmission until a contention slot corresponding to the priority of the data packet;
   wherein, when the station detects a collision of the data packet in a contention slot, the station enters a contention protocol to resolve the collision between contending stations for that contention slot; and
   wherein, when the station receives a collision notification signal from the shared communication channel and the station was not involved in the collision, the station reduces the priority of the data packet awaiting transmission so as to withhold transmission until completion of the contention protocol between contending stations.

2. The system as in claim 1, wherein the contention protocol includes dividing a time interval following a collision into a plurality of signal slots.

3. The system as in claim 2, wherein the signal slots are used for signaling opportunities for contending stations to share information for the contention protocol implemented using a tree or stack-based collision resolution technique.

4. The system as in claim 2, wherein each contending station which has entered the contention protocol pseudo-randomly selects one of the plurality of signal slots, and signals that selection by transmitting a signal onto the shared communication channel in the selected signal slot.

5. The system as in claim 2, wherein the controller for monitoring the priority of the data packet awaiting transmission further comprises:
   a first stack that indicates a priority level of contending stations;
   a second stack that indicates the priority of the data packet awaiting transmission; and
   control logic for incrementing and decrementing the second stack based on at least one of: (a) a carrier sense signal; (b) a collision detect signal; (c) a collision notification signal; and (d) a transmitted signal in a signal slot.

6. The system as in claim 5, wherein the first stack is used to initialize the second stack when the station has prepared a Previously presented packet for transmission.

7. The system as in claim 3, wherein a pattern of selection of signal slots by a station in the contention protocol conveys side-band signaling information to other stations, whereby the selection of signal slots is used to specify a subordinate level of priority within the priority level associated with the contention protocol.

8. The system as in claim 1, wherein the collision notification signal has a duration of transmission interval that is distinguishable from the range of transmission intervals used by non-colliding transmissions.

9. The system as in claim 8, wherein the first station simulates a collision by forcing its transmission to have a duration that falls within the predetermined interval defined for collisions.

10. A channel signal transmitted over a packet-switched multiple-access network, the channel signal comprising:
a collision notification signal for indicating a collision of transmissions by contending stations in a contention slot, and for causing non-contending stations connected to the network to delay transmission for a period sufficient to allow resolution of the collision between the contending stations;
at least one collision resolution signal after the collision notification signal, the collision resolution signal occurring a predetermined period after the collision notification signal so as to fall within one of a plurality of signal slots;
a data packet transmission signal after the at least one collision resolution signal, the data packet transmission signal occurring a predetermined period after the collision resolution signal so as to fall within one of a plurality of contention slots, each contention slot having a unique priority to provide multiple levels of priority of access.

11. The channel signal as in claim 10, wherein the collision resolution signal is used to share information between stations used for collision resolution.

12. The channel signal as in claim 10, further comprising:
side-band signaling at the MAC layer, the side-band signaling providing information for the PHY (physical) layer; and
a deterministic label indicator slot for indicating that a pattern of votes by a station in the signal slots is the result of the station intending to convey side-band signaling information for the PHY layer.

13. A method for a packet-switched multiple-access network, the method comprising:
transmitting packets to a shared communication channel and receiving packets from the channel;
sensing whether the channel is in use and preventing transmissions when the channel is in use;
detecting the occurrence of a collision on the channel between a first transmission and a second transmission;
transmitting a collision notification signal to the channel when a collision is detected;
dividing a time period following successful completion of a transmission on the channel into a plurality of contention slots in order of priority;
delaying transmission of a first data packet awaiting transmission until a contention slot corresponding to the priority of the first data packet awaiting transmission;
upon detection of a collision in a contention slot, entering a contention protocol to resolve the collision between contending stations for that contention slot; and
when a second data packet awaiting transmission was not involved in a collision detected in a contention slot, reducing a priority of the second data packet awaiting transmission so as to withhold transmission of the second data packet until completion of the contention protocol between contending stations.

14. The method as in claim 13, wherein the signal slots are used for signaling opportunities for the first station to share information with other stations which are connected to the channel, used for the contention protocol.

15. The method as in claim 14, wherein the contention protocol is implemented using a tree or stack-based collision resolution technique.

16. The method as in claim 14, wherein the contention protocol comprises each station contending for access in a given contention slot pseudo-randomly selecting among the possible signal slots and signaling that vote by transmitting a signal during the selected signal slot.

17. The method as in claim 13, further comprising:
providing a first stack that indicates a priority level of contending stations;
providing a second stack that indicates the priority of the data packet awaiting transmission, and
incrementing and decrementing the second stack based on at least one of: (a) a carrier sense signal; (b) a collision detect signal; (c) a collision notification signal; and (d) a transmitted signal in a signal slot.

18. The method as in claim 17, wherein the first stack is used to initialize the second stack when a Previously presented packet has been prepared for transmission.

19. The method in claim 13, wherein a pattern of selection of signal slots by a station in the contention protocol conveys side-band signaling information to other stations, whereby the selection of signal slots is used to specify a subordinate level of priority within the priority level associated with the contention protocol.

20. The method as in claim 13, wherein the collision notification signal has a duration of transmission interval that is distinguishable from a transmission interval used by a non-colliding transmission.

21. The method as in claim 20, further comprising simulating a collision by forcing a transmission to have a duration that falls within the predetermined duration defined for collisions.

22. The system as in claim 1, wherein following a collision resolution in which at least one contending station reduces a priority of transmission to allow a second contending station to transmit without collision, all non-contending stations reduce a priority of transmission to allow the at least one contending station to transmit without collision following completion of transmission by the second contending station.

23. The system as in claim 2, wherein the contention protocol further includes dividing a time period following the signal slots into a plurality of contention slots arranged in order of priority.

24. The system as in claim 4, wherein upon a collision within a signal slot of signals transmitted by a sub-set of the contending stations, each of the sub-set of contending stations transmits a collision notification signal and recommences a contention protocol, and wherein each contending station not in the sub-set of contending stations reduces the priority of the data packet awaiting transmission so as to withhold transmission until completion of the recommenced contention protocol between the sub-set of contending stations.

25. The carrier wave signal as in claim 10, wherein a time period following the signal slots is divided into a plurality of contentions slots arranged in order of priority.

26. The method as in claim 13, wherein following a collision resolution in which at least one contending station reduces a priority of transmission to allow a second contending station to transmit without collision, all non-contending stations reduce a priority of transmission to allow the at least one contending station to transmit without collision following completion of transmission by the second contending station.

27. The method as in claim 13, wherein the contention protocol further includes dividing a time period following the signal slots into a plurality of contention slots arranged in order of priority.

28. The method as in claim 13, wherein upon a collision within a signal slot of signals transmitted by a sub-set of the contending stations, each of the sub-set of contending stations transmits a collision notification signal and recommences a contention protocol, and wherein each contending station not in the sub-set of contending stations reduces the priority of the data packet awaiting transmission so as to withhold transmission until completion of the recommenced contention protocol between the sub-set of contending stations.

29. A station for connection to a shared communication channel of a packet-switched multiple-access network, the station comprising:
 a network interface for transmitting packets to the shared communication channel and receiving packets from the shared communication channel;
 a carrier sense for sensing whether the shared communication channel is in use and for preventing transmissions by the station when the shared communication channel is in use;
 a collision detect for detecting the occurrence of a collision between a first transmission by the station and a second transmission on the shared communication channel, and for causing a collision notification signal to be transmitted to the shared communication channel by the station when a collision is detected;
 a slot timer for dividing a time period following successful completion of a transmission on the shared communication channel into a plurality of contention slots in order of priority;
 a controller for monitoring a priority of a data packet awaiting transmission and for delaying transmission of the data packet awaiting transmission until a contention slot corresponding to the priority of the data packet;
 wherein, when the station detects a collision of the data packet in a contention slot, the station enters a contention protocol to resolve the collision between contending stations for that contention slot; and
 wherein, when the station receives a collision notification signal from the shared communication channel and the station was not involved in the collision, the station reduces the priority of the data packet awaiting transmission so as to withhold transmission until completion of the contention protocol between contending stations.

30. The station as in claim 29, wherein the contention protocol includes dividing a time interval following a collision into a plurality of signal slots.

31. The station as in claim 30, wherein the signal slots are used for signaling opportunities for contending stations to share information for the contention protocol implemented using a tree or stack-based collision resolution technique.

32. The station as in claim 30, wherein each contending station which has entered the contention protocol pseudo-randomly selects one of the plurality of signal slots, and signals that selection by transmitting a signal onto the shared communication channel in the selected signal slot.

33. The station as in claim 29, wherein the controller for monitoring the priority of the data packet awaiting transmission comprises:
 a first stack that indicates a priority level of contending stations;
 a second stack that indicates the priority of the data packet awaiting transmission, and
 control logic for incrementing and decrementing the second stack based on at least one of: (a) a carrier sense signal; (b) a collision detect signal; (c) a collision notification signal; and (d) a transmitted signal in a signal slot.

34. The station as in claim 33, wherein the first stack is used to initialize the second stack when the station has prepared a Previously presented packet for transmission.

35. The station as in claim 30, wherein a pattern of selection of signal slots by the station in the contention protocol conveys side-band signaling information to other stations, whereby the selection of signal slots is used to specify a subordinate level of priority within the priority level associated with the contention protocol.

36. The station as in claim 29, wherein the collision notification signal has a duration of transmission interval that is distinguishable from the range of transmission intervals used by non-colliding transmissions.

37. The station as in claim 36, wherein the first station simulates a collision by forcing its transmission to have a duration that falls within the predetermined interval defined for collisions.

38. The channel signal as in claim 10, wherein at least two collision resolution signals are transmitted in a single signal slot, and further comprising at least one subsidiary collision resolution signal after the at least two collision resolution signals, the at least one subsidiary collision resolution signal occurring a predetermined period after the at least two collision resolution signals so as to fall within one of a plurality of subsidiary signal slots.

39. The channel signal as in claim 38, wherein a pattern of selection of signal slots and subsidiary signal slots within which collision resolution signals and subsidiary collision resolution signals are transmitted represents a tree or stack-based collision resolution technique.

* * * * *